UNITED STATES PATENT OFFICE.

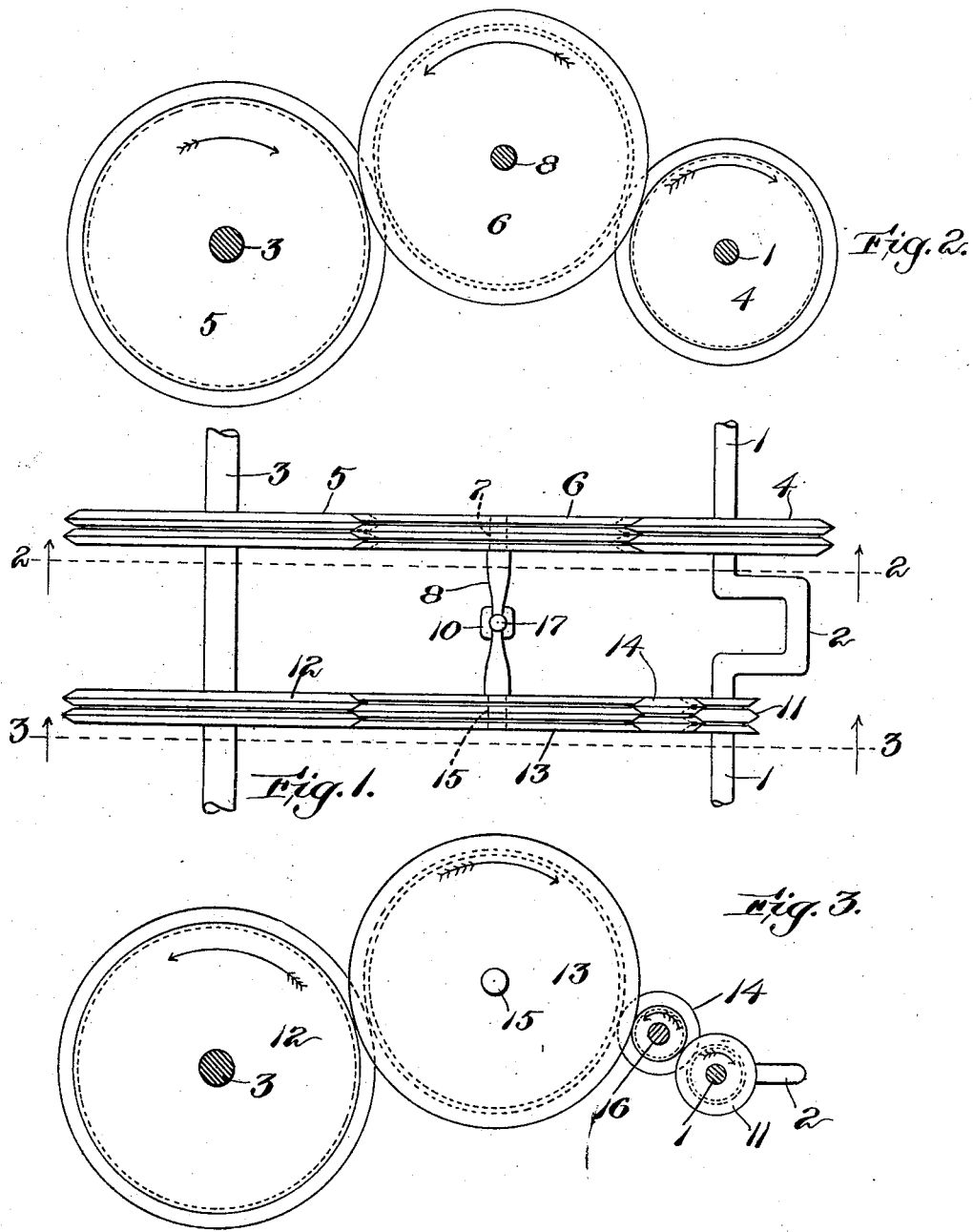

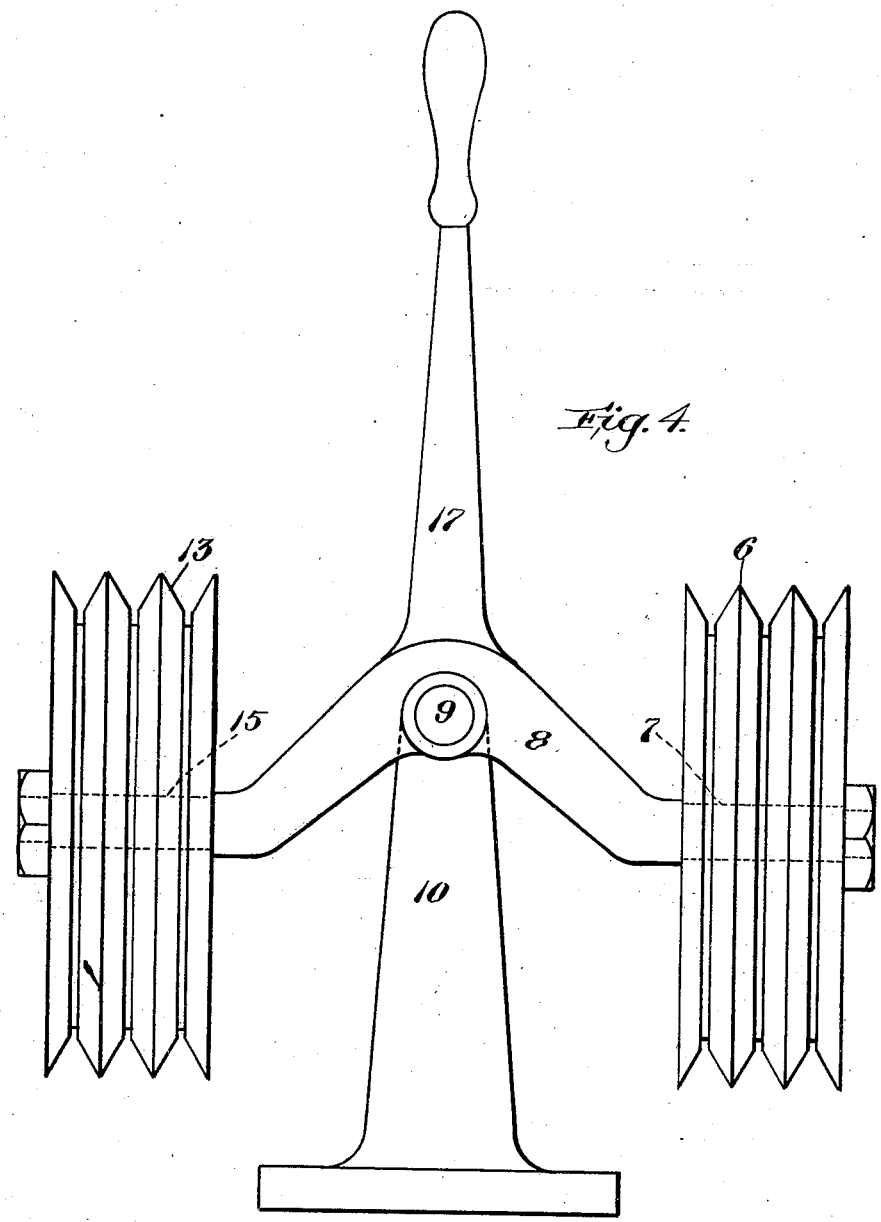

ALFRED ADAMSON, OF LYNN, MASSACHUSETTS.

REVERSING-GEAR FOR MOTOR-VEHICLES.

SPECIFICATION forming part of Letters Patent No. 673,071, dated April 30, 1901.

Application filed January 24, 1901. Serial No. 44,603. (No model.)

*To all whom it may concern:*

Be it known that I, ALFRED ADAMSON, a citizen of the United States, residing at Lynn, in the county of Essex, State of Massachusetts, have invented a certain new and useful Improvement in Reversing-Gears for Motor-Vehicles, of which the following is a specification, reference being had therein to the accompanying drawings.

In the drawings, Figure 1 is a plan view of a reversing-gear for motor-vehicles embodying one form of my invention. Fig. 2 is a section on line 2 2 of Fig. 1 as viewed in the direction indicated by the arrows. Fig. 3 is a section on line 3 3 of Fig. 1 as viewed in the direction indicated by the arrows. Fig. 4 is a detail hereinafter described.

My invention has for its object to provide an improved reversing-gear which shall be particularly adapted for embodiment in a motor-propelled vehicle, although it will be clear from what follows that my invention is not limited to this particular use.

My improved reversing-gear comprises a driving-shaft to which power is applied, a driven shaft, a train of friction-wheels for rotating the driven shaft in one direction, a train of friction-wheels for rotating the driven shaft in the opposite direction, a lever, and means connecting the lever with one of the wheels of each train of friction-wheels, by means of which lever the two wheels connected therewith may be adjusted relatively to the two trains of wheels, so as to throw one train of wheels into operation and the other train of wheels out of operation to thereby reverse the direction of rotation of the driven shaft.

In the preferred form of my invention the two movable wheels of the two trains which are controlled by the lever are supported on a pivoted frame or rocker to which the lever is fast, and said rocker preferably has its pivotal point located between the two trains of wheels, so that when one of the movable wheels is swung into operative position the other movable wheel is swung out of operative position.

In the drawings, 1 represents the driving-shaft, which may be, as is herein shown, made with a crank 2, so as to serve as the crank-shaft of a motor.

3 represents the driven shaft, and when my invention is embodied in a motor-propelled vehicle shaft 3 is connected in any suitable manner with the driving-wheels of the vehicle.

Shaft 1 is connected with the driven shaft 3 by two trains of friction-wheels, one train comprising a wheel 4, fast to driving-shaft 1, a wheel 5, fast to driven shaft 3, and an intermediate wheel 6, journaled on a stud 7, projecting from a rocker 8, which is pivoted at 9 on a standard 10, fixed to any suitable support. The other train of wheels comprises a wheel 11, fast to shaft 1, a wheel 12, fast to shaft 3, and two intermediate wheels 13 and 14, wheel 13 being journaled on a stud 15, projecting from rocker 8, and wheel 14 being journaled on a stud 16, fixed to any suitable support.

It will be clear that the train of wheels 4, 5, and 6 when in operation will drive shaft 3 in one direction and that when the train of wheels 11, 12, 13, and 14 is in operation shaft 3 will be driven in the opposite direction.

Fast to rocker 8 is a shipper-lever 17, which is under the control of the operator, and when lever 17 is in a vertical position, as shown in Fig. 4, wheels 6 and 13 are both out of operative relation with the other wheels of their respective trains, and it will be obvious that by swinging lever 17 rocker 8 may be swung on pivot 9, and either of the two wheels controlled thereby may thus be brought into engagement with the other wheels of its train, and that by swinging lever 17 in one direction shaft 3 will be driven in one direction and that by swinging lever 17 in the opposite direction shaft 3 will be driven in the opposite direction.

In order to obtain the greatest possible surface contact between the wheels, the latter are each circumferentially grooved, as shown in Figs. 1 and 4, so as to provide annular ribs alternating with annular V-shaped grooves, the annular ribs on one wheel entering the annular grooves on the other.

By the employment of friction-wheels to connect the driving and driven shafts the gear is not only capable of being used to reverse the direction of rotation of the driven shaft, but is also capable of being used as a brake to stop the driven shaft, or otherwise act upon it as a brake after it has been set in motion by one of the trains of wheels, as will be clear to all skilled in the art..

What I claim is—

1. The improved reversing-gear comprising a driving-shaft; a driven shaft; a train of friction-wheels for rotating the driven shaft in one direction; a train of friction-wheels for rotating the driven shaft in the opposite direction; a lever; and means connecting the lever with one of the wheels of each train of wheels whereby by movement of the lever the two wheels connected therewith may be adjusted relatively to the two trains of wheels so as to throw one train of wheels out of operation and the other train of wheels into operation to thereby reverse the direction of rotation of the driven shaft.

2. In combination, driving-shaft 1; driven shaft 3; the train of friction-wheels 4, 5 and 6; the train of friction-wheels 11, 12, 13 and 14; rocker 8 carrying wheels 6 and 13; and lever 17, substantially as described.

In testimony whereof I affix my signature in presence of two witnesses.

ALFRED ADAMSON.

Witnesses:
CHAS. F. RANDALL,
WILLIAM A. COPELAND.